No. 748,548. PATENTED DEC. 29, 1903.
G. WENZELMANN & E. H. OVERHOLT.
TONGUE SUPPORT.
APPLICATION FILED APR. 9, 1903.
NO MODEL. 2 SHEETS—SHEET 1.
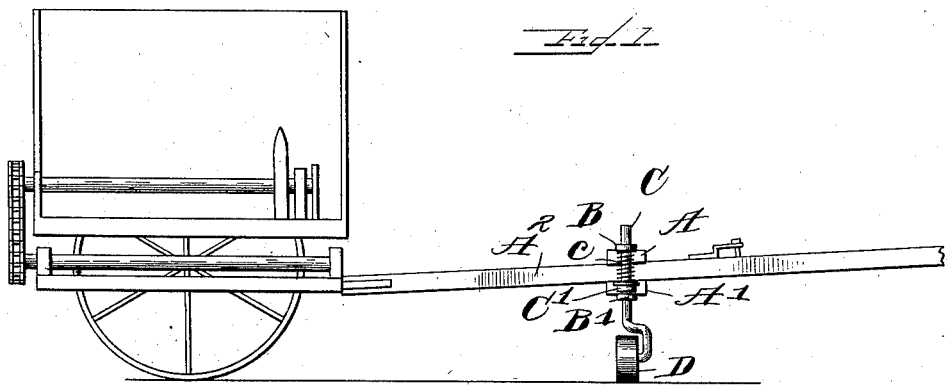
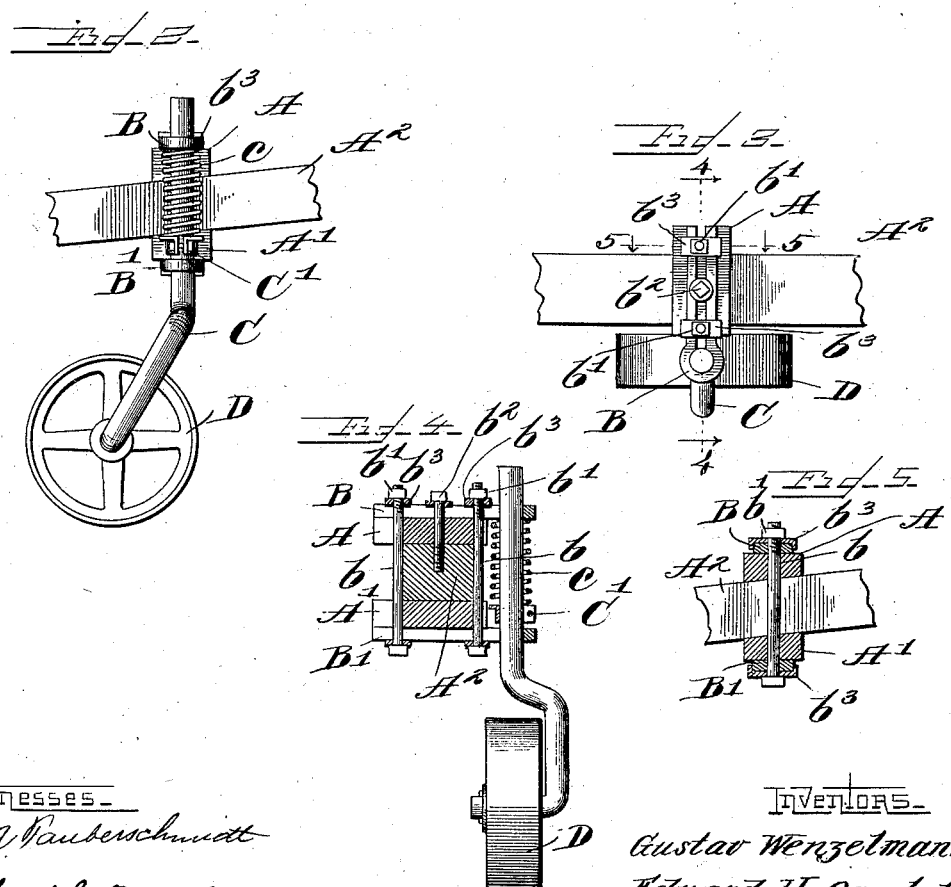
Witnesses
Inventors
Gustav Wenzelmann
Edward H. Overholt

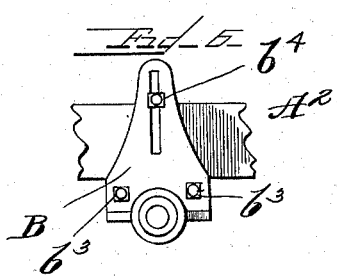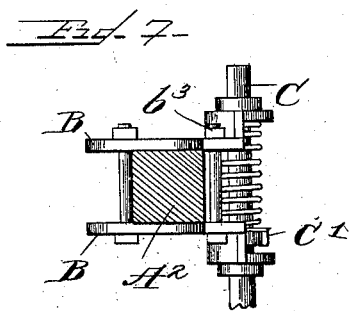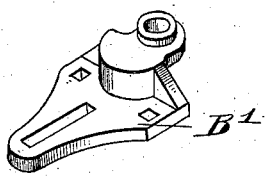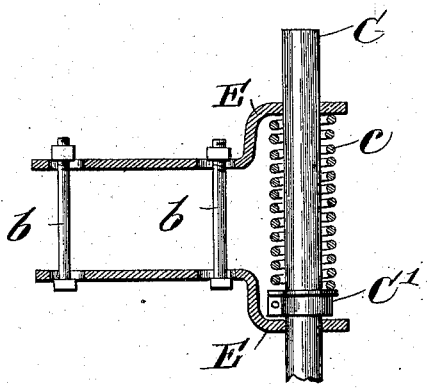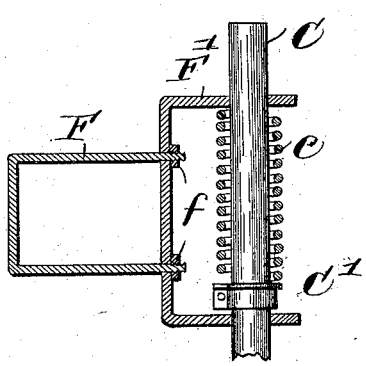

No. 748,548.

Patented December 29, 1903.

UNITED STATES PATENT OFFICE.

GUSTAVE WENZELMANN AND EDWARD H. OVERHOLT, OF STREATOR, ILLINOIS, ASSIGNORS TO WENZELMANN MANUFACTURING COMPANY, OF STREATOR, ILLINOIS, A CORPORATION OF ILLINOIS.

TONGUE-SUPPORT.

SPECIFICATION forming part of Letters Patent No. 748,548, dated December 29, 1903.

Application filed April 9, 1903. Serial No. 151,705. (No model.)

*To all whom it may concern:*

Be it known that we, GUSTAVE WENZELMANN and EDWARD H. OVERHOLT, citizens of the United States, and residents of the city of Streator, county of Lasalle, and State of Illinois, have invented certain new and useful Improvements in Tongue-Supports; and we do hereby declare that the following is a full, clear, and exact description of the same, reference being had to the accompanying drawings, and to the letters of reference marked thereon, which form a part of this specification.

This invention relates more particularly to a tongue-support adapted to be used upon agricultural machinery and also vehicles.

In many kinds of agricultural machinery drawn by horses the weight carried upon the animal's necks is excessive. This is especially true of certain classes of harvesting machinery when the driver is off his seat and the cutting apparatus raised from the ground, a condition due in part to the effort to produce an equilibrium when the machine is in operation and the driver seated.

The object of this invention is to provide a tongue-support especially adapted to be used in connection with machines or vehicles the tongues of which are not pivotally connected thereto, and consequently in which the usual forms of support cannot well be used.

A further object of the invention is to provide a cheap, simple, and durable device which may be quickly and securely adjusted to the tongue of any desired machine or vehicle and which will act to relieve the necks of the draft-animals from any undue weight.

The invention consists in the matters hereinafter described, and more fully pointed out and defined in the appended claims.

In the drawings, Figure 1 is a perspective view of a device embodying my invention. Fig. 2 is a side elevation of the same. Fig. 3 is a top plan view. Fig. 4 is a section taken on line 4 4 of Fig. 3. Fig. 5 is a section taken on line 5 5 of Fig. 3. Figs. 6 and $6^a$ are modifications of the clamping-plate. Fig. 7 is a longitudinal vertical section of the same. Figs. 8 and 9 are views similar to Fig. 7, but illustrate slightly-modified constructions.

As shown in said drawings, A and A' indicate blocks of wood or any desired materials adapted to be engaged, respectively, upon the top and body of the tongue $A^2$ of a harvester or the like, preferably at a point intermediate the draw-pin and the machine. Said blocks are of a length somewhat greater than the width of the tongue and are beveled on their contact-faces therewith to an angle, which insures their opposite faces lying in approximately horizontal planes when the tongue is in its normal operating position. Above and below said blocks, extending transversely of the tongue, are the brackets B and B', which may also be of any desired material, but preferably of iron or steel, cast, stamped, or otherwise suitably formed, and the ends of which upon one side of the tongue extend beyond the blocks A and A' and are apertured to form a bearing for the pivot-shaft C of the supporting-wheel D. Said brackets are longitudinally slotted either in the form of a clevis, as shown in Figs. 3, 4, and 5, or having an elongated aperture, as shown in Figs. 6, $6^a$, and 7, as preferred. Tension-bolts $b$ $b$ extend through said slots and through communicating vertical slots in the overhanging ends of the blocks A A' and, together with the stud-bolt $b^2$, which extends through the upper bracket and the block A and has threaded engagement in the tongue, adapts the device to be rigidly secured to tongues of different widths. In the construction shown in Figs. 3, 4, and 5 washers or clips $b^3$ are provided which engage between the brackets and the heads and nuts of the bolts $b$ $b$ and have lateral downturned flanges thereon which engage over the sides of the said brackets and prevent spreading. In the construction shown in Figs. 6, $6^a$, and 7 the brackets are secured by the bolts $b^3$ $b^3$, which engage through apertures therein, and the bolt $b^4$, which movably engages in the slots in said brackets.

The shaft C is bent at its lower end at a right angle therewith to form the axle for the wheel D, which may be secured thereon by any well-known means. Said shaft is also bent laterally and rearwardly above the wheel to bring the axis of the latter out of alinement with the axis of the pivot-shaft. Said pivot-shaft passes through the apertured ends of the brackets and is provided above the lower bracket with an adjustable collar C', which acts to prevent said shaft from dropping from its bearings and bears against the lower end of a strong coiled spring c, carried on said shaft, and which engages the underside of the bracket A. Said spring acts normally to hold the wheel in its lowermost position, but allows it to move vertically without a corresponding movement of the tongue should the wheel D run over an obstacle in its path. If desired to use a longer spring and give the shaft a greater vertical movement, the protruding ends of the brackets may be bent oppositely to give the required space, as indicated by the brackets E E in Fig. 8, or, if preferred, a clasp or clip F may be secured on the tongue, as shown in Fig. 9, and the integrally-connected brackets F' engaged to the threaded ends thereof by means of nuts.

The operation of my device is as follows: When the tongue is elevated to its normal operative position with the support secured thereon, the pivot-shaft assumes a vertical position, since the tension-brackets lie approximately in horizontal planes, and being journaled in said brackets is free to turn, so that the wheel D disposes itself in the line of draft whether the machine be moving forwardly or is turning from its forward course. The device is adjusted on the tongue in position to yieldingly support the weight from the horses' necks at all times over uneven ground or small obstacles to prevent elevating the tongue.

Obviously the support may be adjusted in different sizes and different heights of tongues and may be used upon any vehicle or machine where it is desired to support the weight which usually falls on the animal's neck, and obviously many details of construction may be varied without departing from the principles of this invention.

I claim as my invention—

1. In a device of the class described the combination with the tongue, of a projecting bracket thereon, means adapted to hold said bracket in approximately a horizontal plane, a pivot-wheel journaled therein, a spring engaging said bracket and the shaft of said wheel and acting to yieldingly support the tongue.

2. In a device of the class described, the combination with a tongue, of brackets projecting transversely above and below the same and adjustable thereon, a pivot-shaft journaled in the ends thereof, means engaging the tongue intermediate the brackets adapted to hold said shaft in a vertical position, a spring acting to force the shaft downwardly and a wheel on the lower end of the pivot-shaft.

3. In a device of the class described the combination with a plurality of slotted brackets having offsets in one end thereof, of bolts extending through the slots and acting to rigidly secure said brackets to the tongue of a harvester or the like, a spring-controlled vertically-movable shaft journaled in the offset of said brackets and a wheel thereon adapted to track upon the ground and to support said tongue in operative position.

4. In a device of the class described the combination with beveled blocks adapted to be secured above and below a draft-tongue their exposed upper and lower surfaces in a horizontal plane when the tongue is in operative position, of a longitudinally-slotted bracket fitted thereon and extending above and below the same, a plurality of bolts passing through said blocks and the slots in the brackets on each side of the tongue, a pivot-wheel journaled in the brackets and adapted to track on the ground and acting to yieldingly support the tongue in an elevated position.

5. The combination with a plurality of blocks adapted to be secured above and below a draft-tongue and complementally beveled on adjacent sides and having slots in the ends, of a longitudinally-slotted bracket adapted to engage on said blocks, bolts extending through said brackets and the slots in said blocks on each side of the tongue, a pivot-wheel journaled in said bracket and tracking on the ground, a spring positioned between the brackets and bearing downwardly on the pivot-wheel, and acting to normally support the tongue on said wheel.

6. In a device of the class described the combination with a plurality of brackets adapted to be secured respectively above and below a draft-tongue, bolts passing on each side the tongue and acting to adjustably secure the bracket to the tongue, a vertically-reciprocating shaft journaled in said brackets, an adjustable collar on said shaft between the brackets, a coiled spring seated thereon and engaging the upper bracket and a wheel adapted to track upon the ground and journaled on the lower end of said shaft.

7. In a device of the class described the combination with brackets having parallel faces adapted to engage above and below a draft-tongue and projecting laterally thereof, of means for rigidly engaging the brackets thereto secured on the ends of the same in close contact with the tongue, a leveling-block engaged between the brackets and slotted to receive said means, a shaft journaled vertically in the projecting ends of said brackets, a spring engaging said shaft between the brackets and acting to yieldingly support a wheel journaled at a right angle with and on the lower end of said shaft and out of alinement of the axis thereof.

8. The combination with slotted brackets adapted to engage transversely above and below a draft-tongue, of bolts passing therethrough on each side the tongue, strengthening-clips engaged on said brackets, clamping-plates engaging said brackets and through which said bolts pass and a pivot-wheel carried by said brackets and acting to yieldingly support the tongue thereon.

In testimony whereof we have hereunto subscribed our names in the presence of two subscribing witnesses.

GUSTAVE WENZELMANN.
EDWARD H. OVERHOLT.

Witnesses:
C. W. HILLS,
A. C. ODELL.